US011905625B2

(12) United States Patent
Guenther et al.

(10) Patent No.: US 11,905,625 B2
(45) Date of Patent: Feb. 20, 2024

(54) CLEANING DEVICE FOR A YARN FORMING ELEMENT OF AN AIR-SPINNING NOZZLE AND METHOD FOR CLEANING A YARN FORMING ELEMENT OF THIS TYPE

(71) Applicant: Saurer Intelligent Technology AG, Arbon (CH)

(72) Inventors: Karoline Guenther, Mönchengladbach (DE); Sarah Meissner, Geilenkirchen (DE); Chandrassekaran Seshayer, Herzogenrath (DE)

(73) Assignee: Saurer Intelligent Technology AG, Arbon (CH)

( * ) Notice: Subject to any disclaimer, the term of this patent is extended or adjusted under 35 U.S.C. 154(b) by 66 days.

(21) Appl. No.: 17/554,243

(22) Filed: Dec. 17, 2021

(65) Prior Publication Data

US 2022/0195635 A1 Jun. 23, 2022

(30) Foreign Application Priority Data

Dec. 18, 2020 (EP) .................................... 20215321

(51) Int. Cl.
*D01H 11/00* (2006.01)
*B08B 1/00* (2006.01)
*D01H 4/02* (2006.01)

(52) U.S. Cl.
CPC ............. *D01H 11/00* (2013.01); *B08B 1/005* (2013.01); *D01H 4/02* (2013.01)

(58) Field of Classification Search
CPC .......... D01H 4/22; D01H 11/00; B08B 1/005; B08B 9/0436
See application file for complete search history.

(56) References Cited

U.S. PATENT DOCUMENTS 4,057,955 A * 11/1977 Roehrich ................. D01H 4/24 57/302
4,546,519 A * 10/1985 Pembroke .............. A61B 1/122 15/104.33

(Continued)

FOREIGN PATENT DOCUMENTS

CN 1242265 A 1/2000
CN 105200579 A 12/2015

(Continued)

OTHER PUBLICATIONS

European Search Report, European Application No. EP20215321, dated May 5, 2021, 1 page.

(Continued)

*Primary Examiner* — Shaun R Hurley
(74) *Attorney, Agent, or Firm* — Nelson Mullins Riley & Scarborough LLP

(57) ABSTRACT

The invention relates to a cleaning device for a yarn forming element of an air-spinning nozzle, to a spinning position of an air-spinning machine and to a method for cleaning a yarn forming element of this type. In order to provide a spinning position of an air-spinning machine and a method for cleaning a yarn forming element of an air-spinning machine which allow long and trouble-free operation with constant quality and strength of the yarn produced, it is provided that the cleaning device has a cleaning strip and a storage unit for providing and retracting the cleaning strip, a fixed end of the cleaning strip being fastened to the storage unit, and a free end of the cleaning strip being able to be provided for cleaning and retracted again after the cleaning. Furthermore, the cleaning device has a cleaning strip guide for feeding the free end of the cleaning strip to the yarn forming element of the air-spinning nozzle for mechanical cleaning.

8 Claims, 3 Drawing Sheets

(56) References Cited

U.S. PATENT DOCUMENTS

| | | | | |
|---|---|---|---|---|
| 5,609,015 | A * | 3/1997 | Raasch | D01H 4/24 57/302 |
| 9,126,241 | B2 * | 9/2015 | Majeed | A61B 90/70 |
| 2007/0226927 | A1 * | 10/2007 | Suzuki | A61B 90/70 15/104.095 |
| 2012/0285485 | A1 * | 11/2012 | Majeed | B08B 9/0436 134/8 |
| 2014/0333753 | A1 * | 11/2014 | Chapman | F16F 15/13461 74/500.5 |
| 2015/0361592 | A1 | 12/2015 | Schäffler et al. | |
| 2020/0022777 | A1 * | 1/2020 | Rama | A61M 25/00 |
| 2020/0224337 | A1 | 7/2020 | Mohr et al. | |

FOREIGN PATENT DOCUMENTS

| | | | |
|---|---|---|---|
| CN | 110892102 | A | 3/2020 |
| DE | 102017115939 | A1 | 1/2019 |
| EP | 2767625 | A1 | 8/2014 |

OTHER PUBLICATIONS

Office Action from corresponding Chinese Patent Application No. 202111550300.3, dated Dec. 13, 2022, all enclosed pages cited (no English translation available).

Office Action from corresponding Chinese Patent Application No. 202111550300.3, dated May 7, 2023, all enclosed pages cited (no English translation available).

* cited by examiner

CLEANING DEVICE FOR A YARN FORMING ELEMENT OF AN AIR-SPINNING NOZZLE AND METHOD FOR CLEANING A YARN FORMING ELEMENT OF THIS TYPE

CROSS-REFERENCE TO RELATED APPLICATIONS

This application claims priority from EP 0215321.9, filed Dec. 18, 2020, entitled "Reinigungsvorrichtung für ein Garnbildungselement einer Luftspinndüse sowie Verfahren zum Reinigen eines solchen Garnbildungselements", the entire contents of which are incorporated herein by reference.

FIELD OF THE INVENTION

The invention relates to a cleaning device for a yarn forming element of an air-spinning nozzle, to a spinning position of an air-spinning machine and to a method for cleaning a yarn forming element of this type.

BACKGROUND OF THE INVENTION

In general, in air spinning a sliver is drafted in a defined way according to the yarn count to be achieved, by means of a multiple roller drafting system, and is subsequently fed to an air-spinning nozzle. Within a vortex chamber of the air-spinning nozzle, the outer fibres of the sliver are wound around an inner fibre core, in the area of an inlet opening of a yarn forming element of the air-spinning nozzle, by means of a vortex air flow produced by air nozzles, so that an air-yarn-specific yarn structure of a parallel yarn core and wrap fibres lying in contact at a certain angle is produced, the wrap fibres being decisive for the desired strength of the yarn. There are clear limits regarding how many fibres must be present in cross-section in order to achieve sufficient strength values, and therefore conventionally spun air yarns are typically in a count range of Ne 20-50.

In principle, the air-spinning method can be carried out with fibres made of different materials; natural fibres, such as cotton and/or animal wool, as well as synthetic fibres, such as polyester, and mixtures of natural and synthetic fibres can be used. In practice, polymer remnants, polyester fibre fragments and/or finish agents are often deposited on a surface of a spinning cone of the yarn forming element in a spinning process with a high proportion of polymer fibres, in particular fibres made of polyester (PES). However, such deposits considerably interfere with the air-spinning process and considerably worsen the spinning result and thus the yarn quality. In particular, thread breaks can occur during the spinning process as a result of the increased friction between the surfaces of the air-spinning nozzle and the fibres. Furthermore, the air nozzles and additional components of the air-spinning nozzle can become clogged by deposits, resulting in lower yarn strength and lower yarn quality of the obtained yarn. And the possible spinning range is disadvantageously limited by such deposits.

SUMMARY OF THE INVENTION

The invention therefore addresses the problem of providing a spinning position of an air-spinning machine and a method for cleaning a yarn forming element of an air-spinning nozzle which allow operation—in particular long and trouble-free operation—with constant quality and strength of the yarn produced.

The problem is solved according to the invention by means of a cleaning device for a yarn forming element of an air-spinning nozzle, a spinning position of an air-spinning machine and a method for cleaning a yarn forming element of an air-spinning nozzle. Advantageous further developments of the invention are stated in the dependent claims.

The cleaning device according to the invention, for at least one yarn forming element of an air-spinning nozzle, which is designed for use in an air-spinning machine, has a cleaning strip and a storage unit for providing and retracting the cleaning strip. A fixed end of the cleaning strip is fastened to the storage unit, in particular releasably and fixably for exchanging of the cleaning strip, and a free end of the cleaning strip can be provided, in particular rolled out, for cleaning of the yarn forming element and can be retracted, in particular rolled in, again after the cleaning. Furthermore, the cleaning device has a cleaning strip guide for feeding the free end of the cleaning strip for mechanical cleaning of the yarn forming element of the air-spinning nozzle.

It is also preferred that the fixed end is fastened such that the fixed end can be rotated about an axis of extent of the cleaning strip. Thus, undesired heavy twisting of the cleaning strip, propagating because the free end is guided around the yarn forming element multiple times, can be avoided. The rotatably fastened fixed end consequently passively corotates, with a delay, as a result of the propagating twisting forces acting on the cleaning strip. Alternatively or in addition, active rotation of the fixed end about the axis of extent of the cleaning strip by means of a rotational drive can preferably be provided in order to allow controlled, defined corotation, in particular identical corotation, of the fixed end in accordance with the movement of the free end, whereby the twisting forces can be reduced as required.

The spinning position of an air-spinning machine according to the invention comprises:—a feed for feeding a sliver to an air-spinning nozzle;—the air-spinning nozzle, which has a sliver inlet for letting the fed sliver into the air-spinning nozzle;—a vortex chamber within the air-spinning nozzle, for producing a vortex air flow by means of at least one vortex air nozzle leading into the vortex chamber;—at least one yarn forming element within the vortex chamber, for producing a yarn from the sliver which is fed into the vortex chamber of the air-spinning nozzle via an exit of the sliver inlet;—a take-up channel extending through the yarn forming element, for the take up of the air-spun yarn; and—a cleaning device, in particular a cleaning device according to the invention, having a free end of a cleaning strip for mechanical cleaning of a surface of the yarn forming element, which free end can be provided from a storage unit and can be fed to the vortex chamber and, after the cleaning, can be retracted again.

In the method according to the invention, for cleaning a yarn forming element of an air-spinning nozzle, more particularly for cleaning a surface of a yarn forming element, first a free end of a cleaning strip is fed from a cleaning device, through a take-up channel of a yarn forming element, into the vortex chamber of the air-spinning nozzle, more particularly up to an exit of a sliver inlet, which exit leads into the vortex chamber, and via which sliver inlet the sliver is introduced into the air-spinning nozzle and into the vortex chamber, and then a vortex air flow is produced in the vortex chamber by means of at least one vortex air nozzle leading into the vortex chamber, in order to guide the cleaning strip over a surface at least at the tip of the yarn forming element and/or over at least one nozzle opening of the vortex air nozzle and/or over a surface of the take-up channel, more particularly multiple times, in order to clean the corresponding areas. Finally, after the cleaning process, the cleaning strip is retracted back through the take-up channel toward or to the cleaning device, preferably into the cleaning device.

By means of the proposed cleaning device and the proposed method, components within the vortex chamber of an air-spinning nozzle can be mechanically cleaned particularly easily. Particularly advantageously, it is not necessary to open the air-spinning nozzle for this purpose, and therefore the cleaning can be carried out particularly quickly and without trouble.

The term "air-spinning nozzle" is understood to mean, in the first place, any spinning nozzle which swirls fibres, more particularly wrap fibres, around an inner fibre core by means of at least one air flow in order to form a thread or yarn. The process of yarn formation occurs in the area of a vortex chamber of the air-spinning nozzle, in which at least one yarn forming element is arranged. The air-spinning nozzle is comprised by a spinning position, each spinning position being used to produce a yarn from a sliver fed to the air-spinning nozzle of the spinning position.

The air-spinning nozzle has a feed and an inlet for the sliver. Furthermore, the air-spinning nozzle has an internal vortex chamber, one or more yarn forming elements or spinning elements, which are arranged at least partly in the vortex chamber, and an outlet for the air-spun yarn produced within the vortex chamber. The outlet is preferably formed as a take-up channel extending completely through the yarn forming element. The take-up channel is preferably formed partly by the yarn forming element and by a yarn channel adjoining the yarn forming element in the take-up direction of the air-spun yarn or exclusively by the yarn forming element.

Furthermore, preferably a plurality of vortex air nozzles leading into the vortex chamber is arranged on the air-spinning nozzle, which vortex air nozzles are particularly preferably fluidically connected to at least one air supply line, which air supply line provides compressed air which flows into the vortex chamber via the air nozzles during the operation of the air-spinning machine. The vortex air nozzle is, or the vortex air nozzles are, arranged in a known way for the production of a vortex air flow within the vortex chamber for the air spinning of the sliver to form a yarn. The vortex chamber is downstream of the sliver inlet with respect to the transport direction of the sliver, or the sliver inlet forms, on a side facing the vortex chamber, a feed opening or an exit to the vortex chamber, which feed opening or exit is provided for the sliver to be fed.

In the context of the invention, a yarn or a thread is a fibre bundle in which at least some of the fibres are wrapped around an inner fibre core. A yarn can also be a roving for further processing, for example by means of a ring spinning machine. The sliver, and thus the yarn produced therefrom, is preferably formed at least partly, particularly preferably completely, from synthetic fibres or man-made fibres, for example from polyester or from polyethersulfone.

Basically, the sliver is the fibre material fed to the air-spinning process, which fibre material is preferably provided as a coherent band or bundle of fibres which are to be spun. All the fibres can be made of the same material, or the sliver can contain fibres which are chemically different from each other. However, the fibres in the sliver are generally not yet spun together.

The yarn forming element can be an independent component, a section of a construction unit, or a functional unit involved directly in the air-spinning process. The yarn forming element can be composed of a single piece or of multiple pieces. The yarn forming element preferably comprises a spinning cone or a part of a spinning cone. The yarn forming element very particularly preferably forms the spinning cone. In the air-spinning process, at least parts of the yarn forming element come into direct contact with the fibres to be spun, in order to produce the yarn, and into direct contact with the spun yarn.

A cleaning device is basically any device by means of which a yarn forming element of an air-spinning nozzle of an air-spinning machine can be mechanically cleaned. The mechanical cleaning is preferably mechanical scrubbing of the surface to be cleaned, within the air-spinning nozzle, by means of the cleaning strip. However, the mechanical cleaning can additionally also be supported by means of a chemical cleaning medium, preferably a cleaning liquid and particularly preferably an aqueous cleaning solution on the cleaning strip. In addition, it is conceivable that a corresponding chemical cleaning medium, more particularly a cleaning liquid, is introduced into the vortex chamber and in particular applied to the surfaces to be cleaned, in order to support the mechanical cleaning by means of the cleaning strip.

In principle, the cleaning strip can have any length, any diameter and any chemical composition, so long as the cleaning strip can still be guided to the air-spinning nozzle's surface to be cleaned and is suitable for the cleaning. The cleaning strip is preferably at least 10%, particularly preferably at least 50%, very particularly preferably at least 100%, and especially preferably at least 200% longer than the distance of the storage unit of the cleaning device from the surface to be cleaned which is farthest from said storage unit, so that complete cleaning is still possible in the event of wear of the cleaning strip, in particular in the area of the tip of the cleaning strip.

The cleaning strip is preferably made of a fibre material and/or has a rough surface in order to support the mechanical cleaning. Furthermore, the cleaning strip is flexible such that the end of the cleaning strip inserted into the air-spinning nozzle for cleaning can be moved over the surfaces of the air-spinning nozzle, more particularly of the yarn forming element, which are to be cleaned and/or over a nozzle opening of the vortex air nozzle, more particularly multiple times, as a result of the vortex air flow. The cleaning strip is especially preferably formed such that the cleaning strip can be guided over a spinning-cone tip, over at least one nozzle opening of the vortex air nozzle and/or over a surface of a take-up channel, more particularly multiple times, by means of the vortex air flow.

It is also preferred that the free end of the cleaning strip forms a fibre group, more particularly during or after application of the vortex air and/or moisture. Thus, the free end can be provided such that the free end has a plurality of separated fibre ends fanned out in the vortex chamber, whereby effective cleaning is made possible. The moisture required for the fanning out can be fed via the vortex air nozzle, for example. The separable fibre ends can be twisted together or adhesively bonded to each other before being fed into the vortex chamber, in which case, for the fanning out, the holding forces can be released by means of the vortex air and/or the moisture.

The storage unit is, in the first place, any component or any assembly for storing the retracted cleaning strip during operation of the spinning position or operation of the air-spinning machine outside of a cleaning process. The storage unit can have a closed housing and/or can be a closed-off construction unit. In principle, the storage unit can also be integrated into another device or construction unit of the air-spinning machine and, more particularly, of the spinning position. The cleaning strip is preferably stored in a rolled-up state. Although in principle it is also conceivable that a plurality of cleaning strips is stored in one storage unit, it is preferred that there is exactly one cleaning strip in each storage unit.

In order to allow cleaning, the cleaning strip is provided from the storage unit and subsequently retracted again. The cleaning strip can be provided actively by means of a drive device or, preferably, passively by means of grasping and pulling at an end of the cleaning strip by means of another device at the spinning position, on the air-spinning machine or on a service unit serving the spinning position and/or by means of a targeted air flow. For cleaning, the cleaning strip is pulled out or moved preferably at least up to the surface to be cleaned which is furthest from the storage unit of the cleaning device. The retracting likewise can be accomplished preferably actively by means of a drive device or in particular by means of a spring which is loaded as the cleaning strip is provided. However, passive retracting by means of gravity or by means of an air flow applied from outside is also conceivable. Active retracting is preferred, however.

The storage unit can be equipped in particular with an apparatus for joining the separated fibre ends of the free end during the retracting. For example, a twisting apparatus can be provided, which twists the fibre group and thus restores a compact free end composed of individual fibre ends which are joined to each other by means of retaining forces, for easy insertion again into the take-up channel. Alternatively or in addition, the apparatus can have a means for moistening the separated fibre ends and a means for compacting the moistened individual fibre ends to form the compact free end.

The term "cleaning strip guide" is understood to mean, in the first place, any means or any device that contributes to the moving or feeding of the cleaning strip from the storage unit or, after the cleaning strip has exited the storage unit, to the air-spinning nozzle and in particular into the interior of the air-spinning nozzle. The cleaning strip guide can be composed of a single piece as a component or of multiple pieces as an assembly. The cleaning strip guide can also be formed by means of other components of an air-spinning machine, more particularly by means of other components of a spinning position of an air-spinning machine, or by means of components of the service unit serving the spinning position. Furthermore, the cleaning strip guide can also be understood functionally and thus can be any means for guiding a free end of the cleaning strip to the yarn forming element to be cleaned.

The term "service unit" is understood to mean any common apparatus or device which can move along the plurality of spinning positions, more particularly lined-up spinning positions, of at least one air-spinning machine in order to perform supportive thread handling work and/or maintenance or service work at a spinning position in question when required.

In a preferred embodiment of the cleaning device, the storage unit has a storage coil for unrolling and rolling up the cleaning strip, the fixed end of the cleaning strip preferably being fastened to the storage coil, whereby the cleaning strip can be rolled up and unrolled in particularly simple way and without the risk of the formation of knots or loops. It is also preferred that the storage coil, together with a cleaning strip thereon, can be removed from the storage unit so that the cleaning strip can be easily exchanged and/or renewed.

According to an advantageous further development of the cleaning device, the storage unit, and in particular the storage coil, is connected to an automatic and/or motor-type drive unit for the controlled providing and/or retracting of the free end of the cleaning strip, whereby active control is possible in a particularly simple way. The drive unit can be electrically and/or pneumatically operated. The drive unit is preferably a motor, but direct driving by means of at least one air flow is also conceivable.

Although in principle the cleaning device can be arranged at any point of a spinning position, of an air-spinning machine or of a service unit, in a preferred embodiment of the spinning position of an air-spinning machine according to the invention the cleaning device is arranged outside of the vortex chamber and preferably outside of the area of the air-spinning nozzle so that the air-spinning process can be performed without interference by the cleaning device. The cleaning device is particularly preferably arranged downstream of the yarn forming element and/or downstream of the take-up channel, with respect to a thread take-up direction of the air-spun yarn, and/or in the area of a unit of the thread preparation means, more particularly on the unit of the thread preparation means.

Arrangement in the area of a unit of the thread preparation means is particularly advantageous, because, in a particularly simple way, the thread preparation means, which is provided for receiving an end of a spun thread, can also receive the free end of the cleaning strip and can guide or pull it, in the same way as a thread end, into the interior of the air-spinning nozzle, more particularly into the vortex chamber, more particularly to the exit of the sliver inlet. Accordingly, it is also preferred that the feeding of the free end of the cleaning strip, in particular to the exit of the sliver inlet, is accomplished by means of a thread-guiding element. The thread preparation means, more particularly a unit of the thread preparation means, can be switched accordingly to allow the free end of the cleaning strip to be guided into the vortex chamber or to the exit of the sliver inlet within the vortex chamber; directly controlling the thread preparation means to grip the end of the cleaning strip is possible, and moving the storage unit and/or the free end of the cleaning strip into the area of the thread preparation means so that the cleaning strip is then gripped instead of the yarn in regular operation of the thread preparation means is also possible.

Many methods for cleaning a yarn forming element in the prior art have the disadvantage that the air-spinning nozzle must be opened for this purpose. Although, in principle, cleaning a yarn forming element by means of a cleaning strip while the spinning nozzle is open would also be conceivable, according to a preferred embodiment of the method cleaning is generally carried out in the closed spinning nozzle or while the vortex chamber is closed. Furthermore, it is preferred that cleaning is carried out during an interruption of the air-spinning operation, so that no spun yarn or sliver to be spun is present in the vortex chamber and the cleaning strip can be inserted into and removed from the vortex chamber unimpeded, more particularly through the take-up channel.

According to a preferred further development of the method for cleaning a yarn forming element, the vortex air flow is switched on during the retracting so that deposits are led away and/or so that the surface of the take-up channel is cleaned better, because, with the vortex air flow switched on, there is movement and/or swirling of the cleaning strip also as the cleaning strip is retracted.

It is also preferred that the vortex air flow is produced in the vortex chamber upon or after the exiting of the free end of the cleaning strip from the take-up channel or upon or after the entrance of the free end into the vortex chamber. Thus, effective and reliable cleaning of the area around the take-up channel opening of the yarn forming element within the vortex chamber can also be ensured. Furthermore, the guiding of the free end of the cleaning strip within the vortex chamber along the surface of the yarn forming element can thereby be reliably enabled.

In principle, the cleaning strip can be repeatedly used over any duration and as often as desired. However, because of increasing soiling and/or wear, in particular in the area of the free end of the cleaning strip, it is advantageous to cut off and discard the tip of the free end of the cleaning strip regularly, in particular by means of the spinning position's, the air-spinning machine's or the service unit's own thread cutting elements; this can be done after every cleaning, after a fixed number of cleanings or according to the degree of soiling or degree of wear. The thread cutting elements can particularly preferably be part of the thread preparation means, by means of which preferably a thread end also can be suitably prepared for a piecing process, in a previously known way, after a winding interruption. Furthermore, regular replacement of the cleaning strip after a fixed number of cleanings or according to the degree of soiling or degree of wear is also conceivable. Moreover, the cleaning strip can also be cleaned during or after the retraction into the cleaning device, in order to at least partially clean the cleaning strip and to extend the service life.

In principle, the cleaning can be carried out at any time and repeated as often as desired. According to a preferred embodiment of the method for cleaning a yarn forming element, a yarn forming element is cleaned in the event of a spinning interruption, for example after at least one thread break or after every thread break, after at least one yarn cut or after every yarn cut, during a removal of a take-up package wound with the air-spun yarn and/or during an exchange of a spinning can, from which the sliver is fed to the spinning position. In particular, cleaning after a thread break allows soiling, which may have been the cause of a thread break, to be eliminated before the air-spinning process is resumed. Cleaning after a yarn cut, during a removal of the take-up package or an insertion of a new empty tube into the winding device, and during an exchange of the spinning can ensures constantly high yarn quality and yarn strength, just as the cleaning after a thread break does. Alternatively or in addition, cleaning can also be carried out periodically with defined identical or different intervals, particularly with respect to the operating time of the spinning position, the number of thread breaks, the number of yarn cuts, the number of take-up package removals or number of inserted empty tubes, the number of spinning can exchanges, in general the number of spinning interruptions or spinning stops, so that regular cleaning can be ensured and long time periods without cleaning can be avoided. Alternatively or in addition, cleaning can also be carried out before the spinning position is started up after a defined downtime and/or before the spinning position is shut down in preparation for a defined downtime. Thus, it can also be ensured that, when the air-spinning process is resumed, these interfering deposits in the air-spinning nozzle are largely minimised or eliminated.

In accordance with a further aspect of the present invention, the spinning position can be comprised by a workstation of the air-spinning machine. The term "workstation" is understood to mean any position at the air-spinning machine at which an air-spun spinning thread or a yarn is produced by means of the spinning position from a sliver fed to the spinning position and is wound by means of a winding device downstream of the spinning position along the thread path in order to wind a take-up package, more particularly a cross-wound package. The sliver can be fed by means of a central sliver store assigned to the air-spinning machine or by means of a sliver store assigned to the individual spinning position, such as, in particular, a spinning can, in which a defined amount of sliver is stored such that the sliver can be removed from the spinning can. The workstation can have additional sliver-handling or thread-handling apparatuses for handling the sliver or the thread in a defined way, as required. The workstation can have sensor systems for monitoring the sliver feed and/or the sliver parameters and, or alternatively, for monitoring the thread take-up, the thread feed to the winding device, the yarn parameters, for clearing yarn faults and/or for piecing after a sliver break or thread break or after a spinning can exchange or a take-up package removal. Furthermore, sensor systems or other apparatuses in the area of a drafting system, which comprises the feed of the sliver, can be assigned to the workstation, by means of which sensor systems or other apparatuses the sliver can be drafted in a defined way, as required, and/or provided with additional fibres, more particularly of a different fibre material, a so-called core yarn.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale.

An embodiment example of a spinning position of an air-spinning machine according to the invention is explained in more detail below with reference to the drawings. In the drawings.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Figure 1:
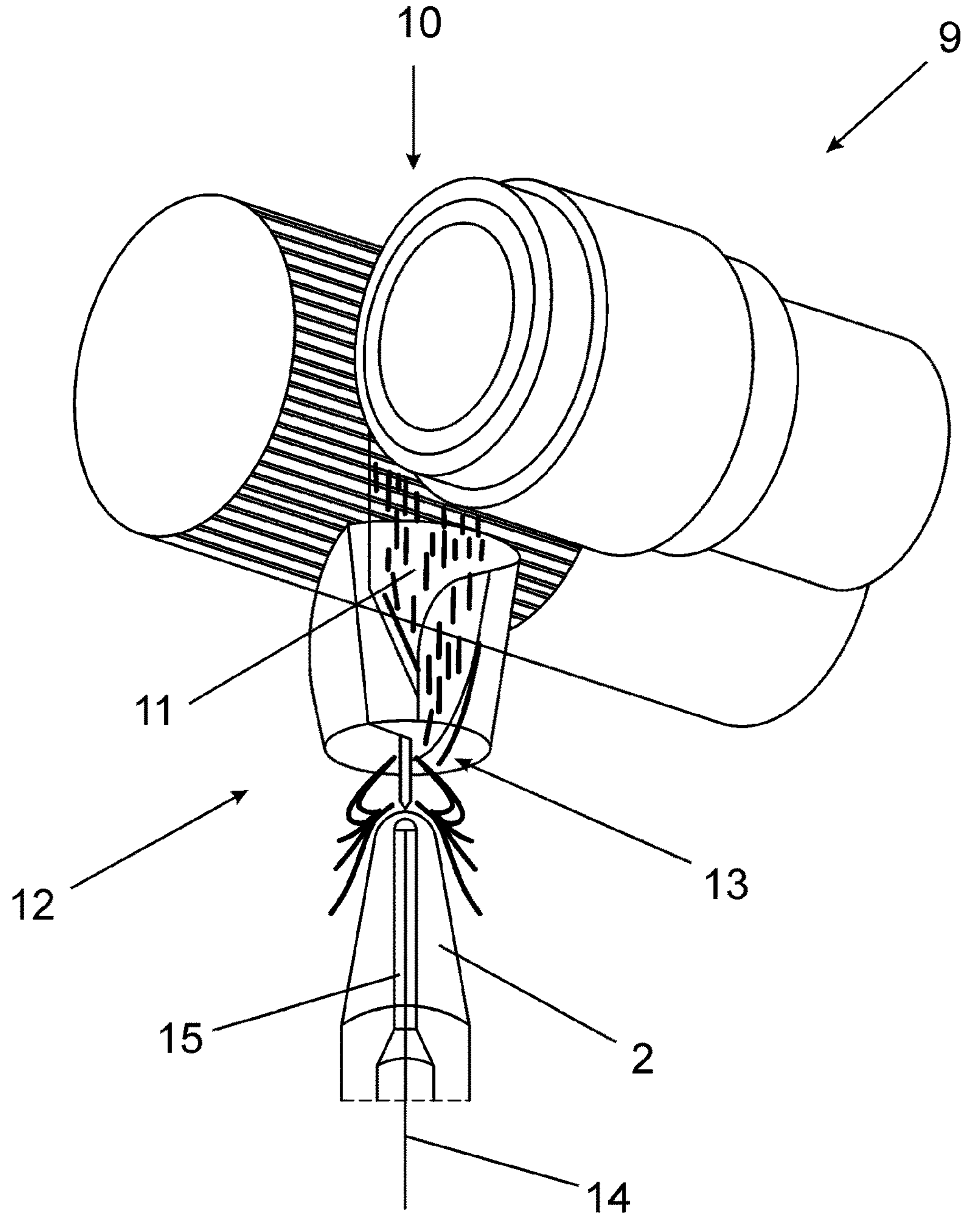
FIG. 1 shows a schematic view of an air-spinning nozzle of an air-spinning machine during the spinning process.

In order to spin a yarn 14 by means of a spinning position 9 of an air-spinning machine from a sliver 11 drafted by means of a drafting system, the sliver 11 is fed, in the area of a feed 10, to an air-spinning nozzle 12 (shown merely schematically in FIG. 1). The sliver 11 enters a vortex chamber within the air-spinning nozzle 12 through an exit 13 of a sliver inlet 16 and is spun into a yarn 14 in the vortex chamber by means of a vortex air flow at a yarn forming element 2 formed as a spinning cone, the outer fibres of the sliver 11 being wound around an inner fibre core by means of the vortex air flow produced by means of vortex air nozzles, so that an air-yarn-specific yarn structure of a parallel yarn core and wrap fibres lying in contact at a certain angle is produced. Finally, the spun yarn 14 is taken up from the air-spinning nozzle 12 through a take-up channel 15 so that the spun yarn 14 can be fed to a subsequent thread-handling apparatus such as a winding device for forming a take-up package.

If a sliver 11 made of synthetic fibres, more particularly polyester fibres, is used in air spinning, fibre fragments and finish agents can be deposited, during the air-spinning process, on the surface of the yarn forming element 2 or on the surfaces of the walls of the vortex chamber of the air-spinning nozzle 12, which walls surround the yarn forming element 2, and these deposits can lead to a worsening of the spinning result and thus to reduced yarn strength and yarn quality over the long term.

In order to be able to clean this surface, a cleaning device 1 is arranged downstream of the take-up channel 15 with respect to the yarn take-up direction and in the area of a unit of the thread preparation means of the spinning position 9. Within a storage unit 4 of the cleaning device 1, a cleaning strip 3 is rolled up on a storage coil 8. A fixed end 5 of the cleaning strip 3 is fastened to the storage coil 8 such that repeated releasing and fixing is possible. The free end 6 of the cleaning strip 3 can be led out of the storage unit 4 and retracted again by the unrolling and rolling up of the storage coil 8. The cleaning strip 3 is made of a fibre material and has a rough surface.

For feeding of the cleaning strip 3 to the air-spinning nozzle 12 after the cleaning strip 3 has been rolled out of the storage unit 4, the cleaning device 1 has, finally, a cleaning strip guide 7, which is formed by additional components of the spinning position 9, more particularly by a unit of the thread preparation means.

Figure 2:
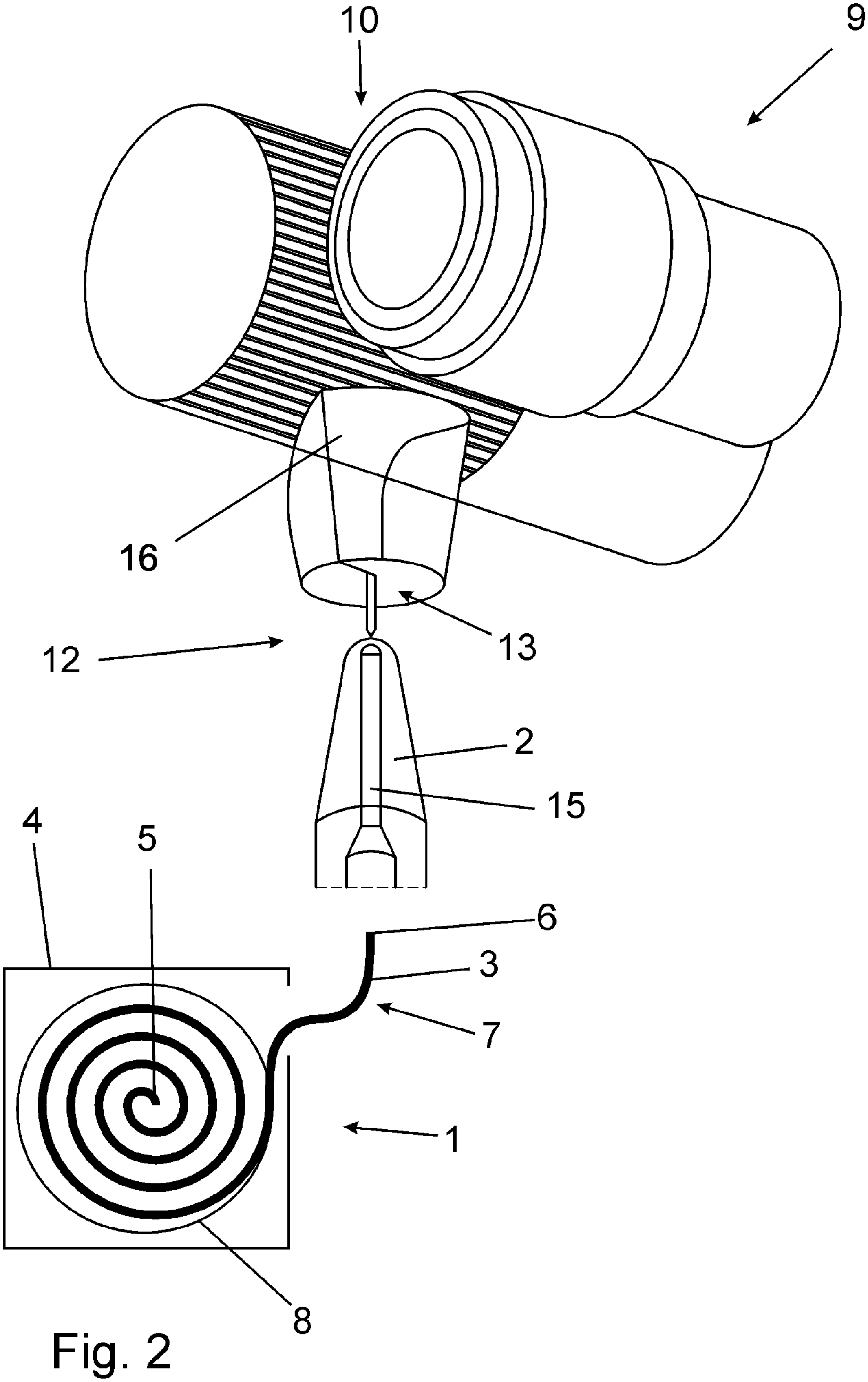
FIG. 2 shows a schematic view of the air-spinning nozzle shown in FIG. 1, with a cleaning device, before cleaning of a yarn forming element of the air-spinning nozzle.
Figure 3:
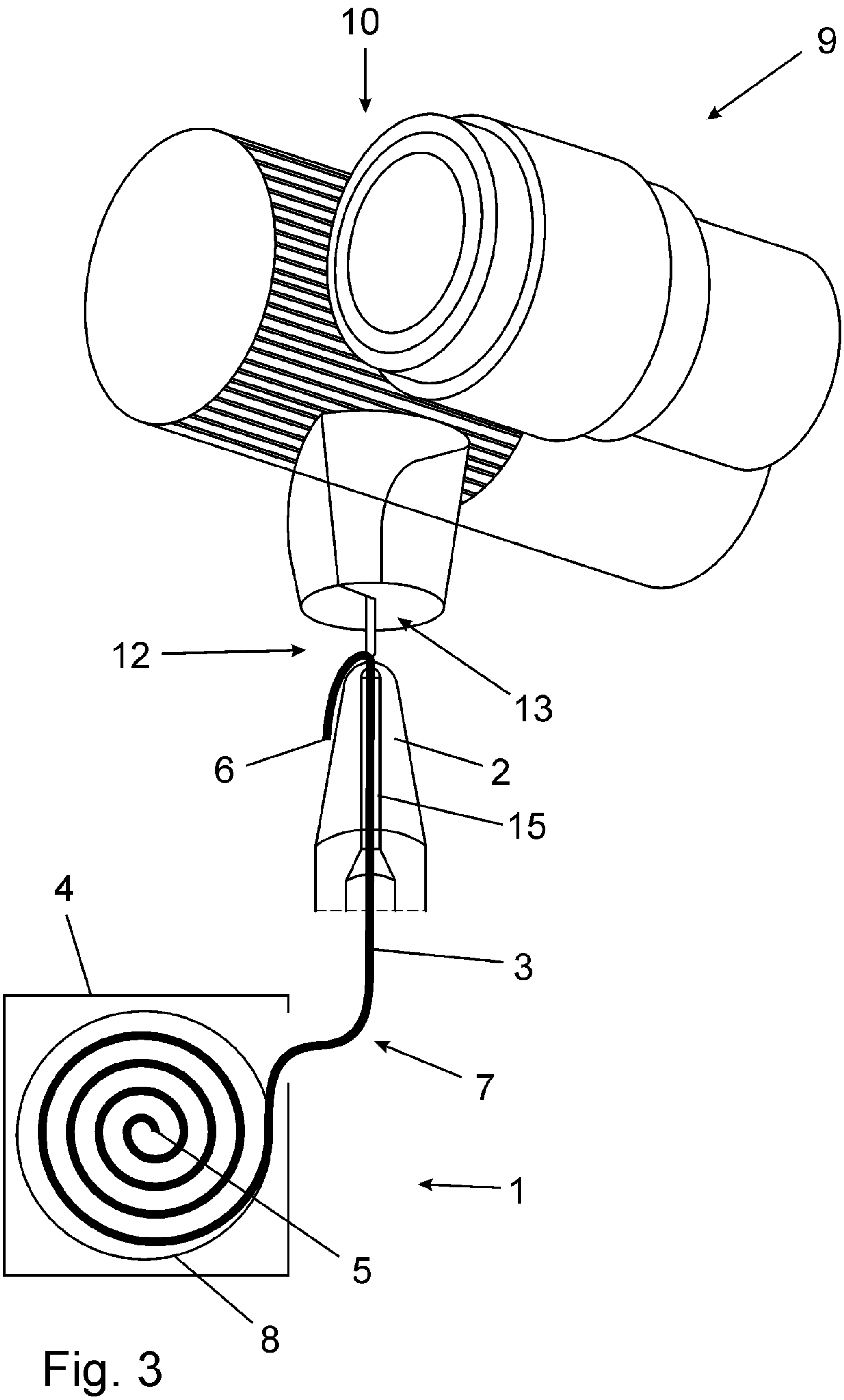
FIG. 3 shows a schematic view of the air-spinning nozzle shown in FIG. 1, with a cleaning device, during the cleaning of the yarn forming element.

To allow the surface of the yarn forming element 2 to be cleaned, the air-spinning process is interrupted and subsequently, while the air-spinning nozzle 12 is still closed, the free end 6 of the cleaning strip 3 is guided into the area of the outer opening of the take-up channel 15 by means of the cleaning strip guide 7 (see FIG. 2).

Subsequently, the free end 6 of the cleaning strip 3 is guided into the take-up channel 15 by the thread preparation means and is advanced from the take-up channel 15 into the interior of the vortex chamber toward the exit 13 of the sliver inlet 16. As a result of the vortex air flow being switched on within the vortex chamber, the free end 6 of the cleaning strip 3 is moved multiple times against and around the surface of the yarn forming element 2, which yarn forming element 2 is formed as a spinning cone. By feeding the cleaning strip 3 to the vortex chamber further, it is also possible to lead the free end 6 of the cleaning strip 3 past the nozzle openings of the vortex air nozzles, cleaning being performed especially in the area of the tip of the yarn forming element 2 and in the area of the nozzle openings. The movement of the free end 6 as a result of the vortex air flow continues along the cleaning strip 3 toward the fixed end 5 such that the surface of the take-up channel 15 within the yarn forming element 2 is also cleaned. The fixed end 5 of the cleaning strip 3 is fastened such that said fixed end 5 can rotate about the axis of extent of the cleaning strip 3, so that undesired heavy twisting of the cleaning strip 3 can be avoided by means of the propagation of the movement of the free end 6 toward the fixed end 5.

Finally, the cleaning strip 3 is pulled back out from the interior of the air-spinning nozzle 12 via the take-up channel 15, a repeated cleaning of the surface of the take-up channel 15 thus being carried out. The cleaning strip 3 is rolled up onto the storage coil 8 again within the storage unit 4 so that the cleaning strip 3 can be stored without knots or loops.

LIST OF REFERENCE SIGNS

1 Cleaning device
2 Yarn forming element
3 Cleaning strip
4 Storage unit
5 Fixed end
6 Free end
7 Cleaning strip guide
8 Storage coil
9 Spinning position
10 Feed
11 Sliver
12 Air-spinning nozzle
13 Exit
14 Yarn
15 Take-up channel
16 Sliver inlet It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A spinning position of an air-spinning machine, comprising:

a feed for feeding a sliver to an air-spinning nozzle, an air-spinning nozzle, which has a sliver inlet for letting the fed sliver into the air-spinning nozzle, a vortex chamber within the air-spinning nozzle, for producing a vortex air flow by at least one vortex air nozzle leading into the vortex chamber, a yarn forming element within the vortex chamber, for producing a yarn from the sliver which is fed into the vortex chamber via an exit of the sliver inlet, a take-up channel extending through the yarn forming element, for the take up of the air-spun yarn, and a cleaning device, having a free end of a cleaning strip for mechanical cleaning of a surface of the yarn forming element, which free end is provided from a storage unit and is fed to the vortex chamber.

2. The spinning position of an air-spinning machine according to claim 1, characterised in that the cleaning device is arranged outside of the air-spinning nozzle.

3. The spinning position of an air-spinning machine according to claim 1, characterised in that the cleaning device is arranged downstream of the yarn forming element, with respect to the thread take-up direction of the air-spun yarn, and/or in an area of a unit of thread preparation.

4. A method for cleaning a yarn forming element of an air-spinning nozzle, comprising:

feeding a free end of a cleaning strip from a cleaning device, through a take-up channel of a yarn forming element, into a vortex chamber of the air-spinning nozzle, producing a vortex air flow in the vortex chamber by at least one vortex air nozzle leading into the vortex chamber, in order to guide the cleaning strip over a surface of the yarn forming element and/or over at least one nozzle opening of the vortex air nozzle, and subsequently retracting the cleaning strip through the take-up channel to the cleaning device.

5. The method for cleaning a yarn forming element according to claim 4, characterised in that the vortex air flow is produced in the vortex chamber upon or after the exiting of the free end of the cleaning strip from the take-up channel or upon or after the entrance of the free end into the vortex chamber.

6. The method for cleaning a yarn forming element according to claim 4, characterised in that the free end of the cleaning strip is guided into a vortex chamber or to an exit of a sliver inlet within the vortex chamber.

7. The method for cleaning a yarn forming element according to claim 4, characterised in that the cleaning is carried out during an interruption of the air-spinning operation, while the air-spinning nozzle is closed.

8. The method for cleaning a yarn forming element according to claim 4, characterised in that the vortex air flow is switched on during the retracting of the free end.

* * * * *